(12) United States Patent
Smith (10) Patent No.: US 11,643,187 B2
(45) Date of Patent: May 9, 2023

(54) BLADE ANGLE POSITION FEEDBACK SYSTEM WITH PROFILED MARKER TERMINATIONS

(71) Applicant: PRATT & WHITNEY CANADA CORP., Longueuil (CA)

(72) Inventor: Michael Smith, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 639 days.

(21) Appl. No.: 16/703,394

(22) Filed: Dec. 4, 2019

(65) Prior Publication Data

US 2020/0324876 A1 Oct. 15, 2020

Related U.S. Application Data

(60) Provisional application No. 62/831,252, filed on Apr. 9, 2019.

(51) Int. Cl.
| | |
|---|---|
| *G01B 7/30* | (2006.01) |
| *G01D 5/20* | (2006.01) |
| *B64C 11/30* | (2006.01) |
| *B64D 31/00* | (2006.01) |

(52) U.S. Cl.
CPC ............ *B64C 11/301* (2013.01); *B64D 31/00* (2013.01); *G01B 7/30* (2013.01); *G01D 5/20* (2013.01)

(58) Field of Classification Search
CPC ......... B64C 11/301; B64D 31/00; G01B 7/30; G01D 5/20
See application file for complete search history.

(56) References Cited

U.S. PATENT DOCUMENTS

| | | | |
|---|---|---|---|
| 9,821,901 B2 | 11/2017 | Duke et al. | |
| 11,286,038 B2* | 3/2022 | Tomescu | G01D 5/347 |
| 2018/0304991 A1* | 10/2018 | Kudrna | G01D 5/147 |
| 2018/0320601 A1 | 11/2018 | Snyder et al. | |
| 2021/0061454 A1* | 3/2021 | Tomescu | G01D 5/347 |

FOREIGN PATENT DOCUMENTS

| | | |
|---|---|---|
| EP | 2806402 | 9/1957 |
| EP | 353076 | 1/1990 |
| EP | 3396304 | 10/2013 |
| EP | 3284666 | 2/2018 |

* cited by examiner

*Primary Examiner* — Reena Aurora
(74) *Attorney, Agent, or Firm* — Norton Rose Fulbright Canada LLP (57) ABSTRACT

There is provided a blade angle feedback assembly for an aircraft-bladed rotor rotatable about a longitudinal axis and having an adjustable blade pitch angle. The assembly comprises a feedback device coupled to rotate with the rotor, the feedback device having a root surface having a first edge, first position markers extending from the root surface and oriented substantially parallel to the axis, the first position markers circumferentially spaced from one another, at least one second position marker extending from the root surface and positioned between two adjacent first position markers at an angle thereto, the at least one second position marker having an end positioned adjacent to the first edge and non-flush therewith, and at least one sensor mounted adjacent the feedback device and configured to detect a passage of the first position markers and the at least one second position marker as the feedback device rotates about the axis.

13 Claims, 7 Drawing Sheets

BLADE ANGLE POSITION FEEDBACK SYSTEM WITH PROFILED MARKER TERMINATIONS

CROSS REFERENCE TO RELATED APPLICATIONS

This patent application claims priority of U.S. provisional Application Ser. No. 62/831,252, filed on Apr. 9, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a blade angle feedback assembly for an aircraft-bladed rotor, the rotor rotatable about a longitudinal axis and having an adjustable blade pitch angle. The assembly comprises a feedback device coupled to rotate with the rotor, the feedback device having a root surface having a first edge, a first plurality of position markers extending from the root surface and oriented substantially parallel to the longitudinal axis, the first plurality of position markers circumferentially spaced from one another, at least one second position marker extending from the root surface and positioned between two adjacent first position markers at an angle thereto, the at least one second position marker having an end positioned adjacent to the first edge and non-flush therewith, and at least one sensor mounted adjacent the feedback device and configured to detect a passage of the first plurality of position markers and the at least one second position marker as the feedback device rotates about the longitudinal axis.

In some embodiments, the end of the at least one second position marker is beveled at an angle with respect to the first edge.

In some embodiments, the end of the at least one second position marker comprises a second edge, the second edge having a first edge section substantially aligned with the first edge and a second edge section angled relative to the first edge.

In some embodiments, the first edge section and the second edge section connect at a geometric centerline of the at least one second position marker, the first edge section forming a first acute angle with the centerline and the second edge section forming a second acute angle with the centerline, the first angle substantially equal to the second angle.

In some embodiments, a notch is formed in the root surface adjacent the second edge section.

In some embodiments, the end of the at least one second position marker comprises a second edge, the second edge having a rounded shape.

In accordance with another broad aspect, there is provided an aircraft-bladed rotor system, comprising a rotor rotatable by a shaft about a longitudinal axis, the rotor having blades with adjustable blade pitch angle, and a feedback device coupled to rotate with the rotor, the feedback device having a root surface having a first edge, a first plurality of position markers extending from the root surface and oriented substantially parallel to the longitudinal axis, the first plurality of position markers circumferentially spaced from one another, and at least one second position marker extending from the root surface and positioned between two adjacent first position markers at an angle thereto, the at least one second position marker having an end positioned adjacent to the first edge and non-flush therewith.

In some embodiments, the system further comprises at least one sensor mounted adjacent the feedback device and configured to detect a passage of the first plurality of position markers and the at least one second position marker as the feedback device rotates about the longitudinal axis.

In accordance with yet another broad aspect, there is provided a blade angle feedback assembly for an aircraft-bladed rotor, the rotor rotatable about a longitudinal axis and having an adjustable blade pitch angle. The assembly comprises a feedback device coupled to rotate with the rotor, the feedback device having a root surface having a first edge, a first plurality of position markers extending from the root surface and oriented substantially parallel to the longitudinal axis, the first plurality of position markers circumferentially spaced from one another, at least one second position marker extending from the root surface and positioned between two adjacent first position markers at an angle thereto, the at least one second position marker having an end positioned adjacent to the first edge and substantially flush therewith, an extrusion of material provided at the end to make the end substantially symmetrical about a geometric centerline of the at least one second position marker, and at least one sensor mounted adjacent the feedback device and configured to detect a passage of the first plurality of position markers and the at least one second position marker as the feedback device rotates about the longitudinal axis.

In accordance with yet another broad aspect, there is provided an aircraft-bladed rotor system, comprising a rotor rotatable by a shaft about a longitudinal axis, the rotor having blades with adjustable blade pitch angle, and a feedback device coupled to rotate with the rotor, the feedback device having a root surface having a first edge, a first plurality of position markers extending from the root surface and oriented substantially parallel to the longitudinal axis, the first plurality of position markers circumferentially spaced from one another, and at least one second position marker extending from the root surface and positioned between two adjacent first position markers at an angle thereto, the at least one second position marker having an end positioned adjacent to the first edge and substantially flush therewith, an extrusion of material provided at the end to make the end substantially symmetrical about a geometric centerline of the at least one second position marker.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
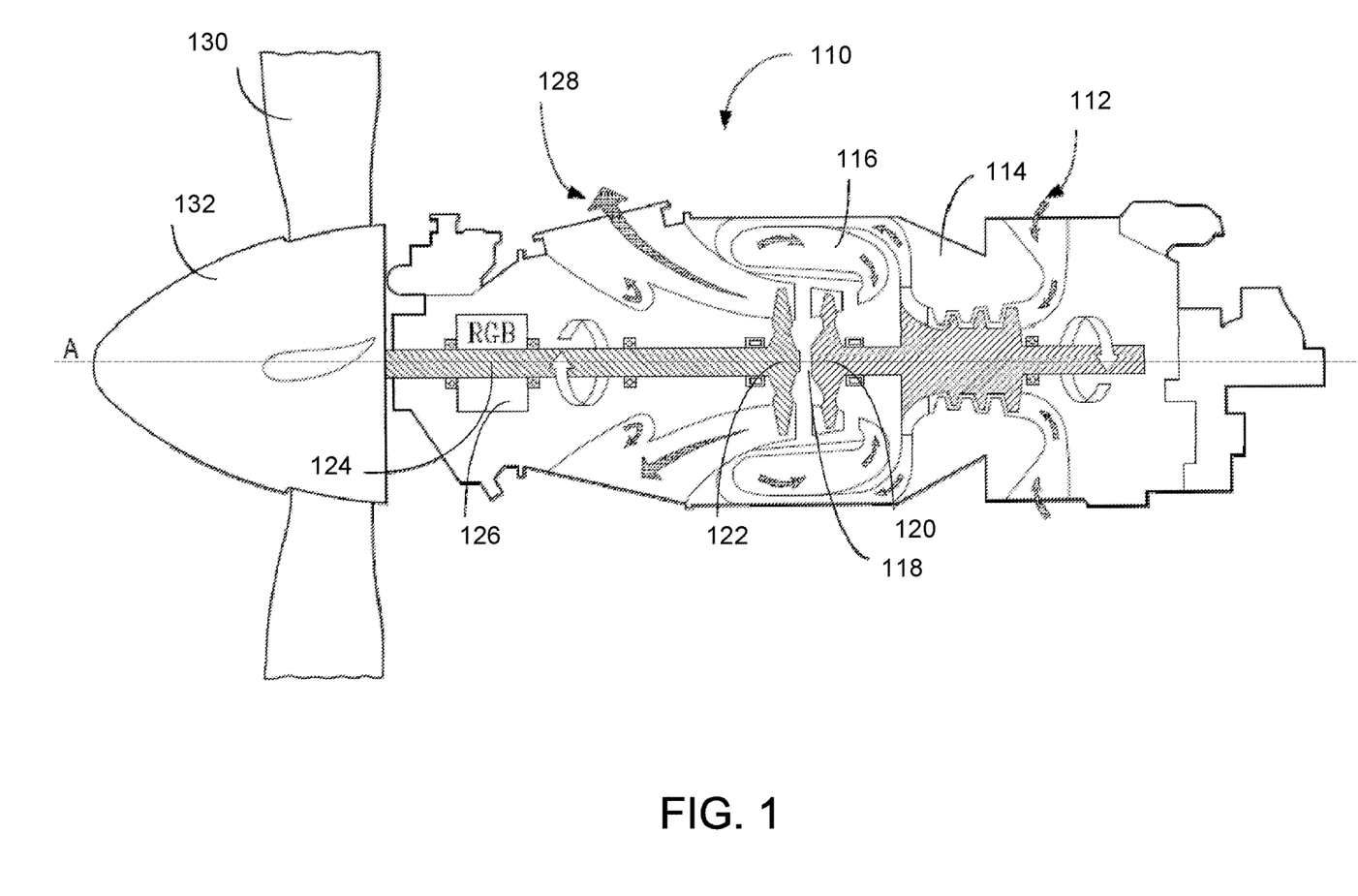
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
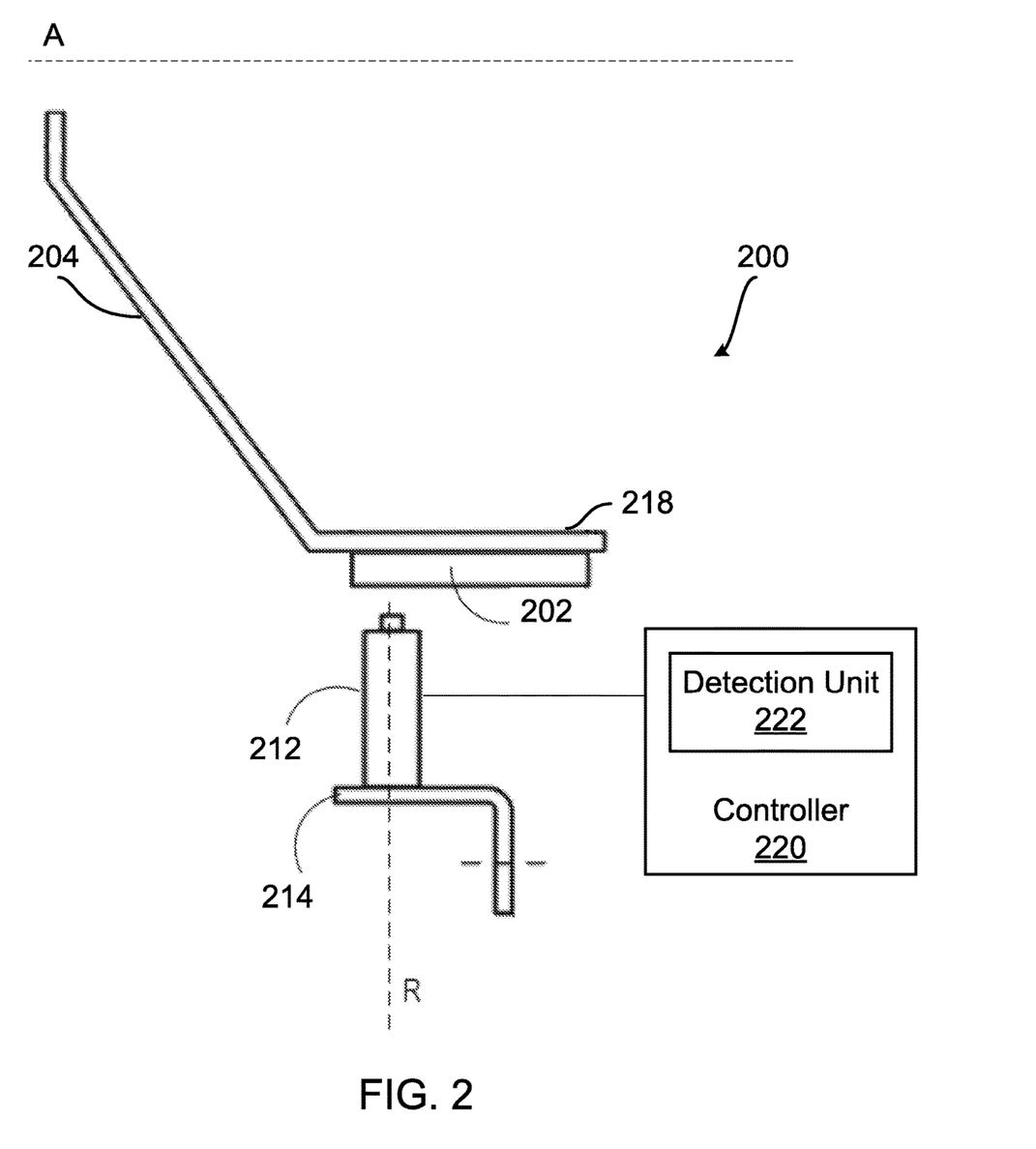
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of detectable features (also referred to as position markers or teeth) 202 disposed thereon for detection by sensor 212. In some embodiments, the feedback device 204 is mounted for rotation with propeller 130 and to move axially with adjustment of the blade angle of the blades of the propeller 130, and the sensor 212 is fixedly mounted to a static portion of the engine 110. In other embodiments, the sensor 212 is mounted for rotation with propeller 130 and to move axially with adjustment of the blade angle of the blades of the propeller 130, and the feedback device 204 is fixedly mounted to a static portion of the engine 110.

The system 200 also includes a controller 220 communicatively coupled to the sensor 212. The sensor 212 is configured for producing a sensor signal which is transmitted to or otherwise received by the controller 220, for example via a detection unit 222 thereof. The sensor signal can be an electrical signal, digital or analog, or any other suitable type of signal. In some embodiments, the sensor 212 produces a series of signal pulses in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic flux within the magnetic field generated by the sensor 212.

In the example illustrated in FIG. 2, a side view of a portion of feedback device 204 and sensor 212 is shown. The sensor 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as dual-signal sources at multiple locations, one or more additional sensors, which may be similar to the sensor 212, are provided. For example, an additional sensor 212 may be mounted in a diametrically opposite relationship, or at any angle, relative to the position markers 202, which extend away from the feedback device 204 and towards the sensor(s) 212. In yet another embodiment, several position markers 202 may be spaced equiangularly about the perimeter of the feedback device 204. Other embodiments may apply.

Figure 3:
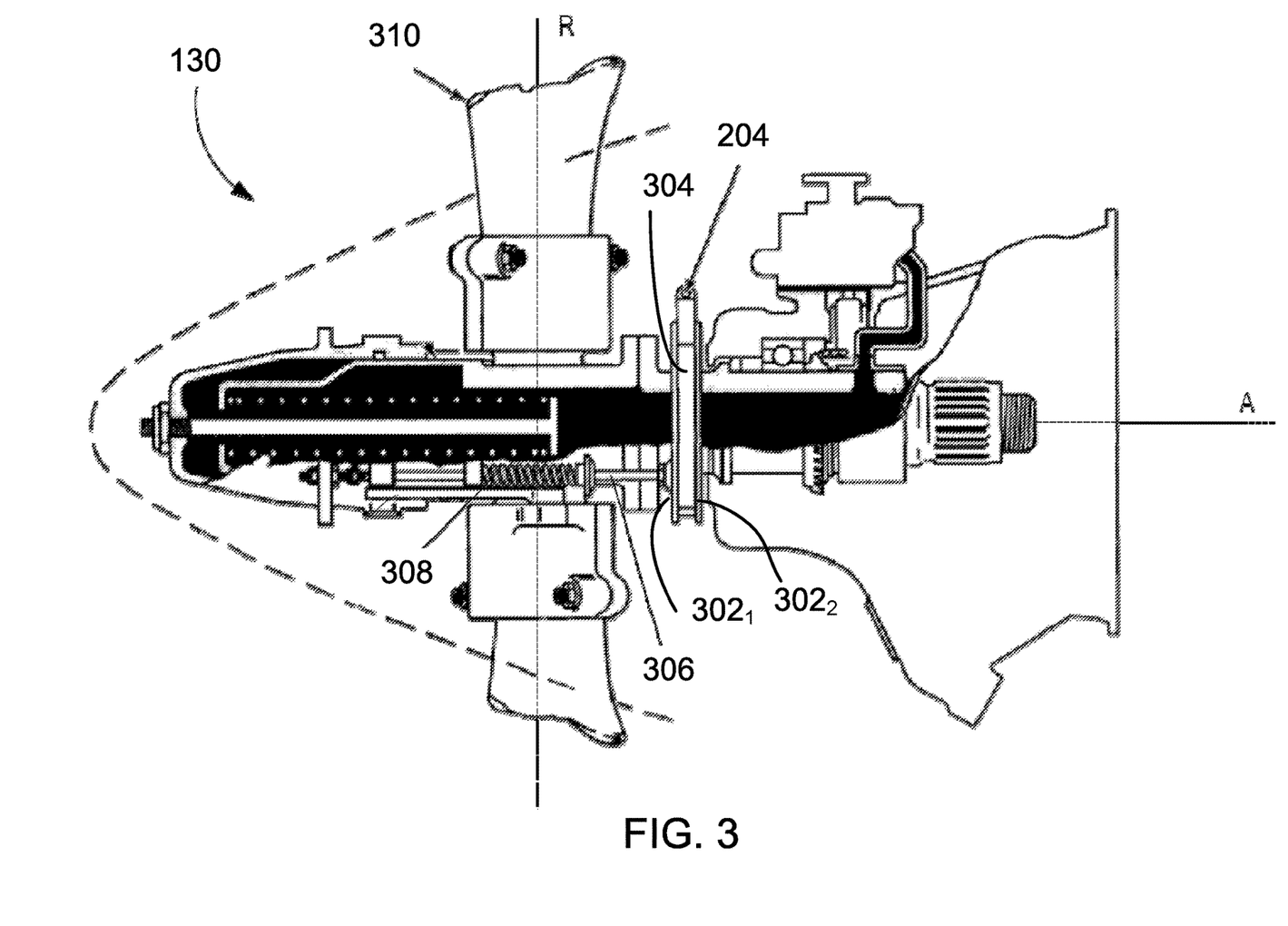
FIG. 3 is a schematic diagram of the propeller of FIG. 1 with the feedback device of FIG. 2, in accordance with an embodiment.

With additional reference to FIG. 3, in some embodiments the feedback device 204 is embodied as a circular disk which rotates as part of the engine 110, for example with the propeller shaft 124 or with the propeller 130. The feedback device 204 comprises opposing faces $301_1$, $301_2$ having outer edges $302_1$, $302_2$ and defines a root surface 304 which extends between the opposing faces $301_1$, $301_2$ and circumscribes them. Put differently, the root surface 304 of the feedback device 204 is the outer periphery of the circular disk which spans between the two opposing faces $301_1$, $302_2$ and the root surface 304 intersects the faces $301_1$, $301_2$ at the edges $302_1$, $302_2$. In these embodiments, the position markers 202 can take the form of projections which extend from the root surface 304.

The position markers 202 may comprise a plurality of first projections (not shown) arranged along a direction substantially transverse to the opposing faces and substantially equally spaced from one another on the root surface 304. The position markers 202 may also comprise one or more second projections (not shown) each positioned between two adjacent first projections. Each second projection is illustratively oriented along a direction, which is at an angle relative to the direction along which the first projections are arranged. The angle can be any suitable value between 1° and 89°, for example 30°, 45°, 60°, or any other value, as appropriate. It should be noted, however, that in some other embodiments the second projection(s) can be co-oriented with the first projections. It should also be noted that in some embodiments, each second projection can be substituted for a groove or inward projection, as appropriate. In addition, in some embodiments, the feedback device 204 includes only a single second projection while, in other embodiments, the feedback device 204 can include more than one second projection. In the latter case, the second projections can be oriented along a common orientation or along one or more different orientations and each second projection can be located at substantially a midpoint between two adjacent first projections or can be located close to a particular one of two adjacent first projections.

In one embodiment, the position markers 202 are integrally formed with the feedback device 204 so that the feedback device 204 may have a unitary construction. In another embodiment, the position markers 202 are manufactured separately from the feedback device 204 and attached thereto using any suitable technique, such as welding or the like.

It should also be noted that, although the present disclosure focuses primarily on embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the circular disk portion of the feedback device 204, such that the feedback device 204 has a substantially smooth or uniform root surface 304. A position marker 202 can then be a portion of the feedback device 204 which is made of a different material, or to which is applied a layer of a different material. The position markers 202 may then be applied to the root surface 304, for instance as strips of metal or other material for detection by the sensor 212, which can be which can be an inductive sensor capable of sensing changes in magnetic flux (as discussed above) or any other suitable sensor such as a Hall sensor or a variable reluctance sensor as discussed herein above. Still other embodiments are considered.

The signal pulses produced by the sensor 212, which form part of the electrical signal received by the control system 220, can be used to determine various operating parameters of the engine 110 and the propeller 130. The regular spacing of the first projections can, for example, be used to determine a speed of rotation of the feedback device 204. In addition, the second projection(s) can be detected by the sensor 212 to determine a blade angle of the propeller 130.

With continued reference to FIG. 3, the feedback device 204 is supported for rotation with the propeller 130, which rotates about the longitudinal axis 'A'. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 310, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

Figure 4A:
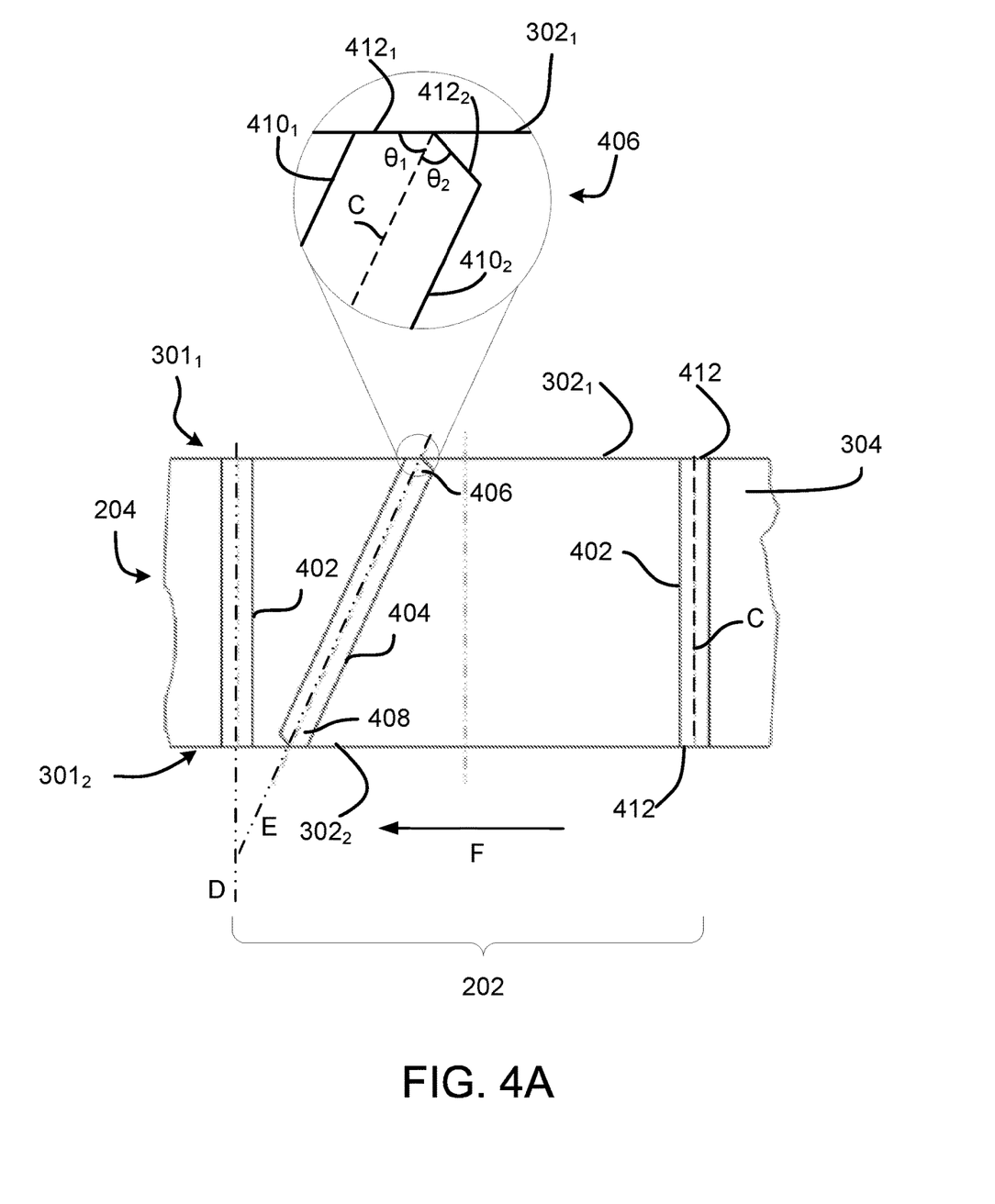
FIG. 4A is a schematic bottom view of the feedback device of FIG. 2 showing the shape of position marker terminations, in accordance with one embodiment.

Referring now to FIG. 4A, the feedback device 204 illustratively comprises position markers 202, which, in one embodiment, can take the form of projections which extend from the root surface 304. As the feedback device 204 rotates, varying portions thereof enter, pass through, and then exit the sensing zone of the sensor 212. From the perspective of the sensor 212, the feedback device 204 moves axially along axis A and rotates about direction 'F'. However, as the sensor 212 moves towards and is positioned adjacent to the edges $302_1$, $302_2$ of the feedback device 204 as a result of movement of the feedback device 204, the markers' magnetic centerline is shifted. As will be discussed further below, this results in a so-called "edge-effect" that leads to an increase in reading error (also referred to herein as beta error) in the measured position of the feedback device 204 at the edges $302_1$, $302_2$. In order to permit the sensor 212 to accurately detect the passage of the position markers 202 without any (or with reduced) edge-related effects, it is proposed herein to modify the geometry of the position markers 202, as will be discussed further below.

In one embodiment illustrated in FIG. 4A, the position markers 202 include a plurality of projections 402 (also referred to herein as 'straight' projections) which are arranged along a direction 'D', which is substantially transverse to the opposing edges $302_1$, $302_2$. Although only two projections 402 are illustrated in FIG. 4A, it should be understood that any suitable number of projections 402 may be present across the whole of the root surface 304. The projections 402 can be substantially equally spaced from one another on the root surface 304. In addition, the projections 402 are of substantially a common shape and size, for example having a common volumetric size.

The feedback device 204 also includes at least one supplementary (or 'angled') projection 404 which is positioned between two adjacent ones of the projections 402. In the embodiment depicted in FIG. 4A, the projection 404 is oriented along a direction 'E', which is at an angle relative to direction 'D'. The angle between directions 'D' and 'E' can be any suitable value between 1° and 89°, for example 30°, 45°, 60°, or any other value, as appropriate. In some embodiments, the feedback device 204 includes only a single supplementary projection 404. In other embodiments, the feedback device 204 can include two, three, four, or more supplementary projections 404. In embodiments in which the feedback device 204 includes more than one supplementary projection 404, the supplementary projections can all be oriented along a common orientation, for instance direction 'E', or can be oriented along one or more different orientations. The projection 404 can be located at substantially a midpoint between two adjacent projections 402, or, as shown in FIG. 4A, can be located close to a particular one of two adjacent projections 402.

As shown in FIG. 4A, each projection 402, 404 extends axially (along longitudinal direction 'D' for projection 402 and along longitudinal direction 'E' for projection 404), from a first axial end or termination 406 to a second termination 408 (opposite the first termination 406), such that each termination 406, 408 is adjacent a corresponding edge $302_1$, $302_2$ of the feedback device 204. Each projection 402, 404 has a first longitudinal edge $410_1$, a second longitudinal edge $410_2$ opposite and substantially parallel to the first longitudinal edge $410_1$, and opposite axial edges (also referred to as 'tips') 412 where the projection 402, 404 terminates. In other words, each termination 406, 408 ends at an edge 412.

In the embodiment of FIG. 4A, for each projection 402, the edge 412 of each termination 406, 408 is substantially parallel to the edge $302_1$, $302_2$ of the feedback device 204 the termination 412, 414 is adjacent to, such that each projection 402 is symmetrical about its geometrical centerline 'C' from one termination 406, 408 to the other. However, if the edges 412 of the angled projection 404 were to also be substantially parallel to the edges $302_1$, $302_2$, this would result in the angled projection 404 being asymmetrical about its geometrical centerline 'C' adjacent the edges $302_1$, $302_2$. Indeed, at each termination 406, 408, more material would be provided on one side of the centerline 'C' (referred to herein as the 'obtuse angle' side) than on the other side (referred to as the 'acute angle' side). For example, for a termination 406 having an edge 412 substantially parallel with the feedback device's edge $302_1$, the portion of the termination 406 delimited by the centerline C, the edge 412, and the second longitudinal edge $410_2$ (obtuse angle side) would have a greater volumetric size than the portion of the termination 406 defined by the centerline C, the edge 412, and the first longitudinal edge $410_1$ (acute angle side). This asymmetric distribution of material on the angled projection 404 would then lead to a distortion of the angled projection's magnetic centerline (away from the geometric centerline C) due to magnetic flux asymmetry. As the sensor 212 approaches the edges $302_1$, $302_2$ of the feedback device 204, this asymmetry would result in an increase in the time interval between the passage of the straight projection 402 and the passage of the angled projection 404, as detected by the sensor 212. This would in turn increase the reading error (or edge-effect) and lead to inaccurate measurement of the position of the feedback device 204 (since the position of the feedback device 204 is determined by the relative timing between the straight projections 402 and the angled projection 404), and thus to inaccurate blade pitch (or beta) angle measurement by the sensor 212.

In order to reduce any edge-related effects, it is proposed herein to modify the geometry of the terminations 406, 408 of each angled projection 404 such that the terminations 406, 408 are symmetrical about the geometric centerline C. As a result, as the sensor 212 approaches the edges $302_1$, $302_2$ of the feedback device 204, the angled projection 404 appears magnetically symmetrical about the geometric centerline C, thus improving the accuracy of the beta measurement system 200.

Figure 4B:
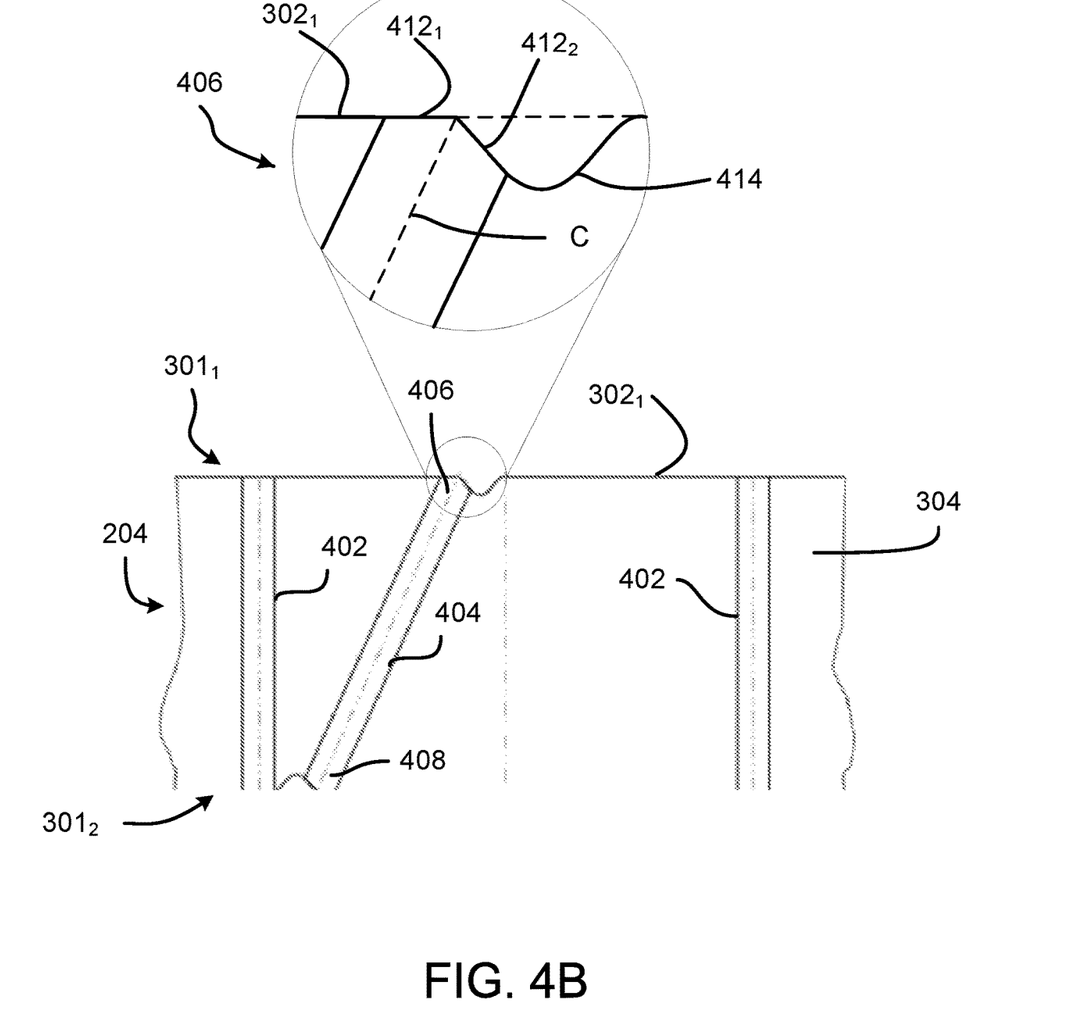
FIG. 4B is a schematic bottom view of the feedback device of FIG. 2 showing the shape of position marker terminations, in accordance with another embodiment.
Figure 4C:
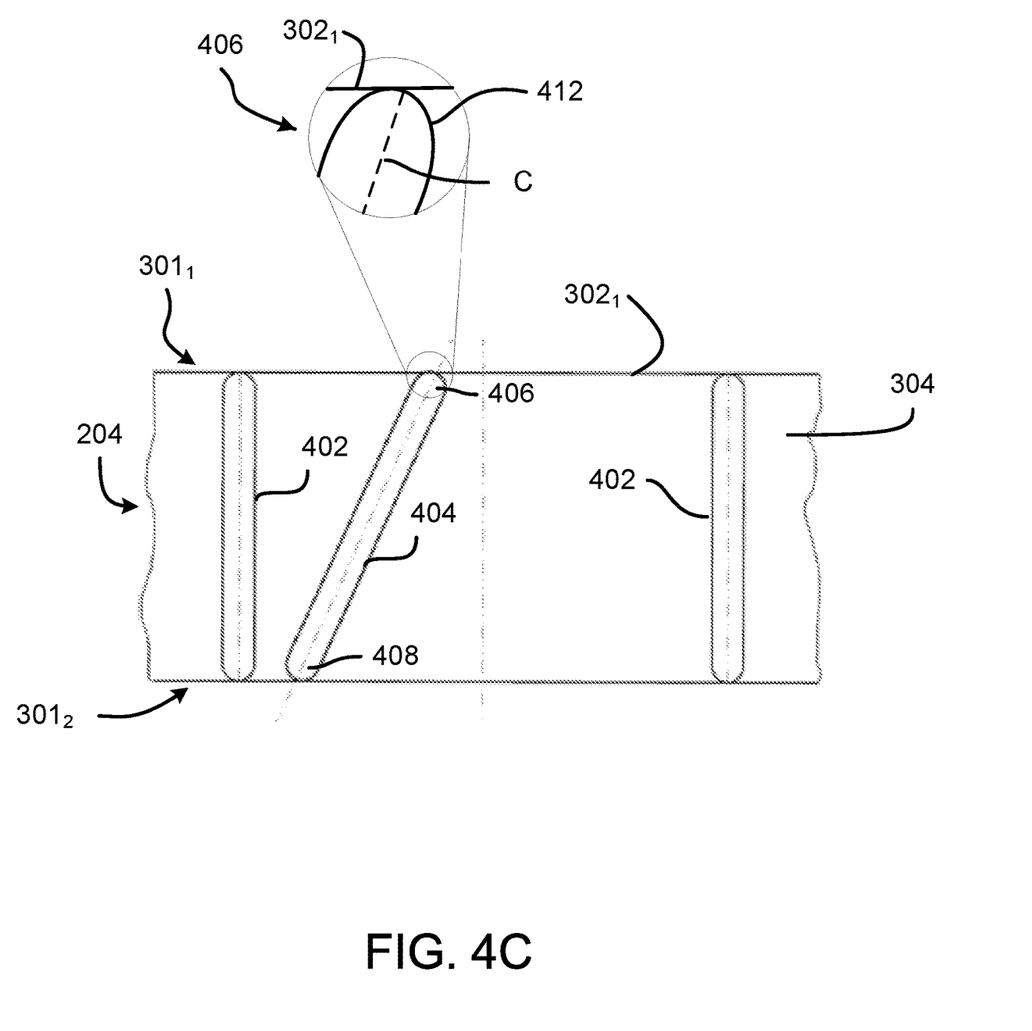
FIG. 4C is a schematic bottom view of the feedback device of FIG. 2 showing the shape of position marker terminations, in accordance with yet another embodiment.

For this purpose, in one embodiment, the terminations 406, 408 of each angled projection 404 are shaped so as to be non-flush with the plane defined by a corresponding feedback device face $301_1$, $301_2$ the termination 406, 408 is adjacent to, as illustrated in FIG. 4A, FIG. 4B, and FIG. 4C. In other words, for each angled projection 404, the edge 412 of each termination 406, 408 is not flush or aligned with (i.e., not parallel to) the edge $302_1$, $302_2$ that the termination 406, 408 is adjacent to. This can be achieved by removing material from the terminations 406, 408, using any suitable manufacturing technique such as milling. In this manner, the angled projection 404 remains symmetrical about the centerline C throughout its length, i.e. from one termination 406, 408 to the other.

In the embodiment shown in FIG. 4A, material is removed from the terminations 406, 408 of the angled projection 404 to achieve beveled chamfered terminations 406, 408. The edge 412 of each termination 406, 408 is indeed beveled at an angle with respect to the edge $302_1$, $302_2$ the termination 406, 408 is adjacent to. In particular, each angled projection termination (illustrated by termination 406 in FIG. 4A) is profiled such that its edge 412 comprises a first section $412_1$ that is substantially aligned with the feedback device's edge $302_1$ and a second section $412_2$ that is at an angle relative to the first edge section $412_1$ and to the edge $302_1$. The first and second edge sections $412_1$, $412_2$ connect at the centerline C and the angle between the second edge section $412_2$ and the feedback device edge $302_1$ is set such that the termination 406 is symmetrical about the centerline C. In particular, the first edge section $412_1$ forms a first acute angle $\theta_1$ with the centerline C and the second edge section $412_2$ forms a second acute angle $\theta_2$ with the centerline C, the first angle $\theta_1$ substantially equal to the second angle $\theta_2$.

Referring now to FIG. 4B in addition to FIG. 4A, in accordance with another embodiment, in addition to profiling the terminations 406, 408 of the angled projection 404 in the manner described above with reference to FIG. 4A, the feedback device 204 is also beveled adjacent the angled projection's terminations 406, 408. For this purpose, material may be removed from the feedback device 204 adjacent the second edge section $412_2$, thereby creating notches as in 414 along the edges $302_1$, $302_2$. In one embodiment, provision of the notches as in 414 may further decrease reading error by further reducing the asymmetric distribution of material on the angled projection 404.

Referring now FIG. 4C, although the edges 412 are illustrated and described herein as being straight, it should be understood that the terminations 406, 408 may also be shaped with arcuate (e.g., rounded) edges 412. The arcuate shape of the edges 412 is illustratively selected to ensure that the angled projection 404 remains symmetrical about the centerline C at the terminations 406, 408. In one embodiment, provision of the arcuate shape at the edges 412 may allow to simplify manufacture and inspection of the feedback device 204 (e.g., by providing all markers 402, 404 with a similar configuration at their terminations as in 406, 408).

Figure 5:
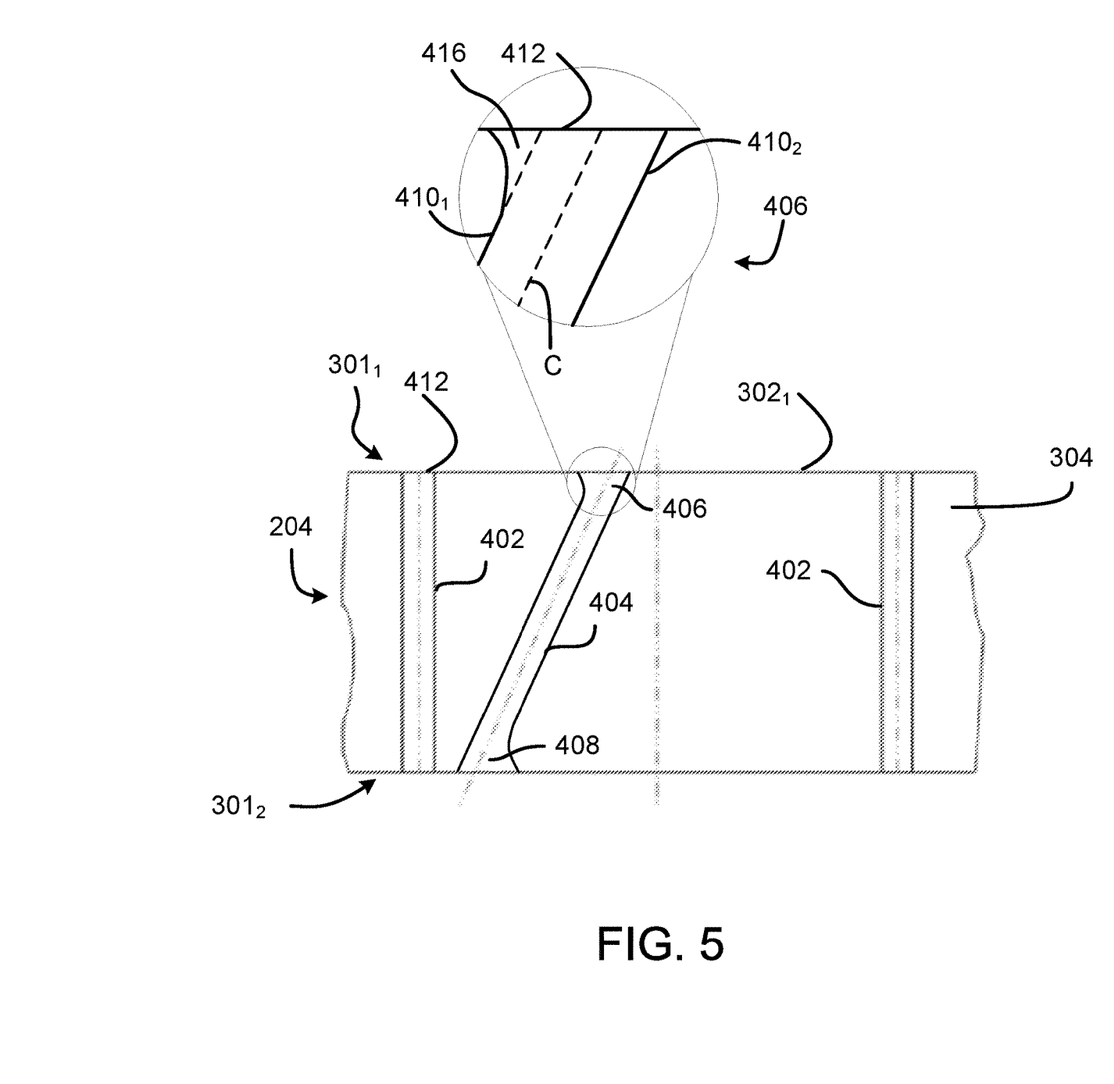
FIG. 5 is a schematic bottom view of the feedback device of FIG. 2, showing the shape of position marker terminations, in accordance with yet another embodiment.

Referring now to FIG. 5, it should also be understood that, in another embodiment, the angled projection 404 may be made symmetrical about the centerline C with the terminations 406, 408 being substantially flush with (i.e. substantially parallel to) the plane defined by a corresponding feedback device face $301_1$, $301_2$ that the termination 406, 408 is adjacent to (and accordingly substantially flush with the corresponding edges $302_1$, $302_2$). For this purpose, material may be added to the terminations 406, 408 to create an extrusion of material 416 on the acute angle side of the termination 406, 408 (without extending the terminations 406, 408 beyond the edges $302_1$, $302_2$). This is in contrast with the embodiments of FIGS. 4A, 4B, and 4C, where material is removed on the obtuse angle side of the terminations 406, 408. For example, the geometry of the termination 406 is modified to add the extrusion of material 416 at the longitudinal edge $410_1$, thereby increasing the volumetric size of the portion of the termination 406 provided at acute angle side. The amount of extrusion of material 416 to be added is such that the volumetric size of the termination 406 at the acute angle side is substantially similar to the volumetric size of the termination at the obtuse angle side, thereby achieving symmetry about the centerline C. In one embodiment, the extrusion of material 416 is integral with the feedback device 204, whereby the extrusion is machined from solid. In another embodiment, the extrusion of material 416 is added to the feedback device 204 by welding. It should however be understood that any suitable manufacturing method including, but not limited to, additive manufacturing, casting, forging, extrusion, powder metallurgy, blanking, broaching, milling, and grinding, may apply.

It should be understood that, although FIGS. 4A to 5 only detail the configuration of the termination 406 (for clarity purposes), the termination 408 is shaped similarly to termination 406 in each embodiment. It should also be understood that the shape of the terminations 412, 414 will be modified differently depending on the configuration of the feedback device 204. Additional factors including, but not limited to, the amount of beta error, the available space according to clearances and tolerance stackup of the feedback system, and the accuracy required by the feedback system, may also come into play.

From the above description, it can be seen that, in one embodiment, the feedback device 204 may be configured to allow for the sensor 212 to be positioned near or at the edges $302_1$, $302_2$ of the feedback device 204 while accurately detecting the passage of the position markers 202, thereby mitigating any edge-related effects that may influence the sensor 212.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly for a rotor of an aircraft, the rotor rotatable about a longitudinal axis and having blades each rotatable about a span-wise axis to adjust a blade pitch angle thereof, the assembly comprising:
   a feedback device having a root surface having a first edge;
   a first plurality of position markers extending from the root surface and oriented substantially parallel to the longitudinal axis, the first plurality of position markers circumferentially spaced from one another;
   at least one second position marker extending from the root surface and positioned between two adjacent first position markers at an angle thereto, the at least one second position marker having an end positioned adjacent to the first edge and non-flush therewith, the end being beveled at an angle with respect to the first edge and the end comprising a first edge section substantially aligned with the first edge and a second section angled relative to the first edge; and
   at least one sensor positioned adjacent the feedback device and configured to detect movement of the first plurality of position markers and the at least one second position marker relative to the at least one sensor, as the rotor rotates about the longitudinal axis.

2. The feedback assembly of claim 1, wherein the first edge section and the second edge section connect at a geometric centerline of the at least one second position marker, the first edge section forming a first acute angle with the centerline and the second section forming a second acute angle with the centerline, the first angle substantially equal to the second angle.

3. The feedback assembly of claim 1, wherein a notch is formed in the root surface adjacent the second edge section.

4. The feedback assembly of claim 1, wherein the feedback device is coupled to rotate with the rotor about the longitudinal axis, the at least one sensor being mounted adjacent to the feedback device to detect a passage of the first plurality of position markers and the at least one second position marker as the feedback device rotates.

5. A bladed rotor system for an aircraft, comprising:
   a rotor rotatable by a shaft about a longitudinal axis, the rotor having blades with adjustable blade pitch angle; and
   a feedback device having
   a root surface having a first edge, a first plurality of position markers extending from the root surface and oriented substantially parallel to the longitudinal axis, the first plurality of position markers circumferentially spaced from one another, and at least one second position marker extending from the root surface and positioned between two adjacent first position markers at an angle thereto, the at least one second position marker having an end positioned adjacent to the first edge and non-flush therewith, the end being beveled at an angle with respect to the first edge and comprising a first edge section substantially aligned with the first edge and a second edge section angled relative to the first edge.

6. The system of claim 5, wherein the first edge section and the second edge section connect at a geometric centerline of the at least one second position marker, the first edge section forming a first acute angle with the centerline and the second edge section forming a second acute angle with the centerline, the first angle substantially equal to the second angle.

7. The system of claim 5, wherein a notch is formed in the root surface adjacent the second edge section.

8. The system of claim 5, further comprising at least one sensor positioned adjacent the feedback device and configured to detect movement of the first plurality of position markers and the at least one second position marker as the rotor rotates about the longitudinal axis.

9. The bladed rotor system of claim 5, wherein the feedback device is coupled to the rotor for rotation therewith about the longitudinal axis.

10. A blade angle feedback assembly for a rotor of an aircraft, the rotor rotatable about a longitudinal axis and having blades each rotatable about a span-wise axis to adjust a blade pitch angle thereof, the assembly comprising:

a feedback device having a root surface having a first edge;

a first plurality of position markers extending from the root surface and oriented substantially parallel to the longitudinal axis, the first plurality of position markers circumferentially spaced from one another;

at least one second position marker extending from the root surface and positioned between two adjacent first position markers at an angle thereto, the at least one second position marker having an end positioned adjacent to the first edge and substantially flush therewith, an extrusion of material provided at the end to make the end substantially symmetrical about a geometric centerline of the at least one second position marker; and at least one sensor positioned adjacent the feedback device and configured to detect movement of the first plurality of position markers and the at least one second position marker as the rotor rotates about the longitudinal axis.

11. The blade angle feedback assembly of claim 10, wherein the feedback device is coupled to rotate with the rotor about the longitudinal axis, the at least one sensor being mounted adjacent to the feedback device to detect a passage of the first plurality of position markers and the at least one second position marker as the feedback device rotates.

12. A bladed rotor system for an aircraft, comprising:

a rotor rotatable by a shaft about a longitudinal axis, the rotor having blades with adjustable blade pitch angle; and a feedback device having a root surface having a first edge, a first plurality of position markers extending from the root surface and oriented substantially parallel to the longitudinal axis, the first plurality of position markers circumferentially spaced from one another, and at least one second position marker extending from the root surface and positioned between two adjacent first position markers at an angle thereto, the at least one second position marker having an end positioned adjacent to the first edge and substantially flush therewith, an extrusion of material provided at the end to make the end substantially symmetrical about a geometric centerline of the at least one second position marker.

13. The bladed rotor system of claim 12, wherein the feedback device is coupled to the rotor for rotation therewith about the longitudinal axis.

\* \* \* \* \*